March 18, 1941.                G. C. BRUEN                2,235,736
                              ROTARY CARD INDEX
                          Filed Oct. 14, 1937          8 Sheets-Sheet 4
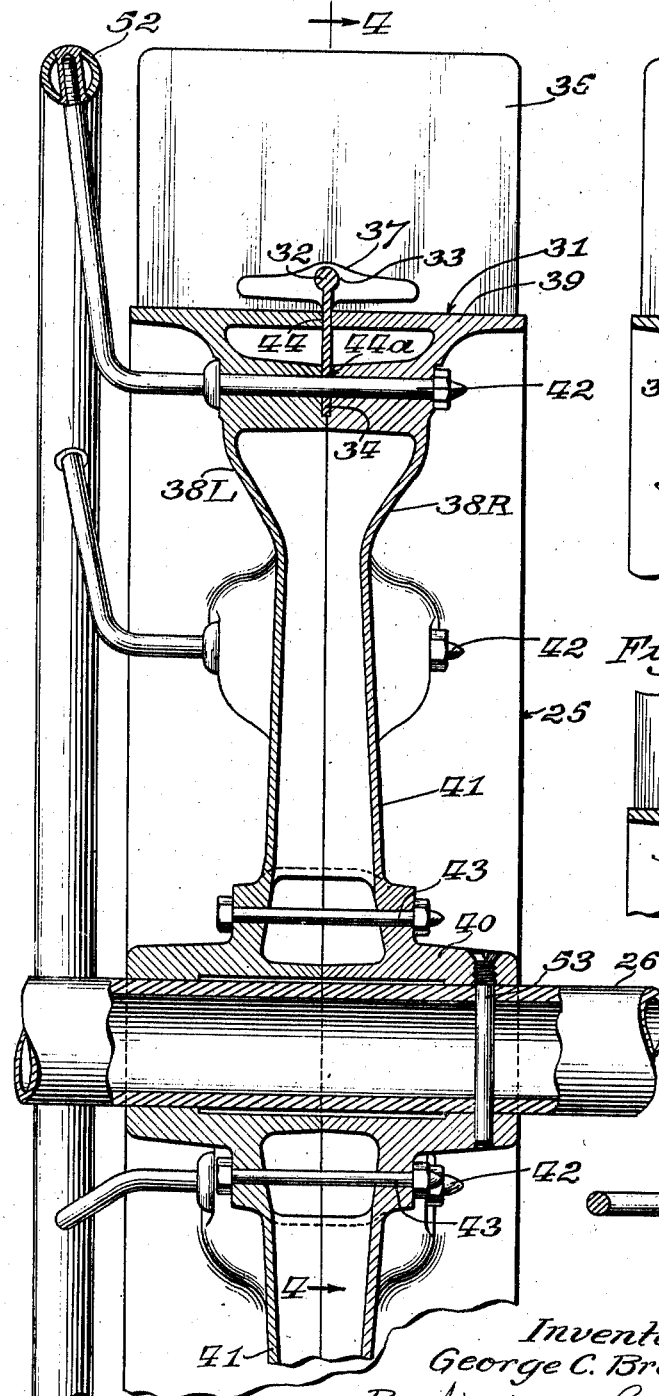
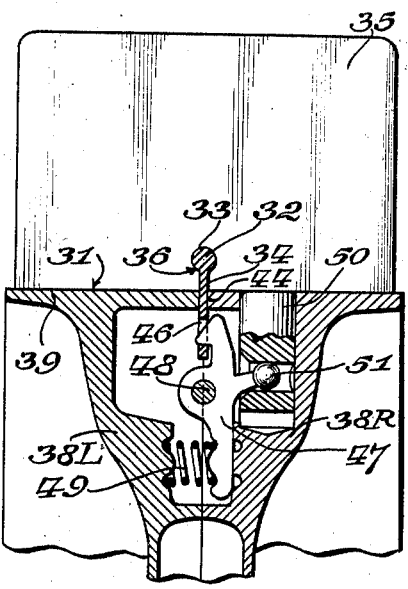
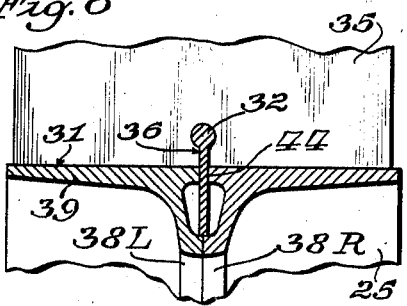
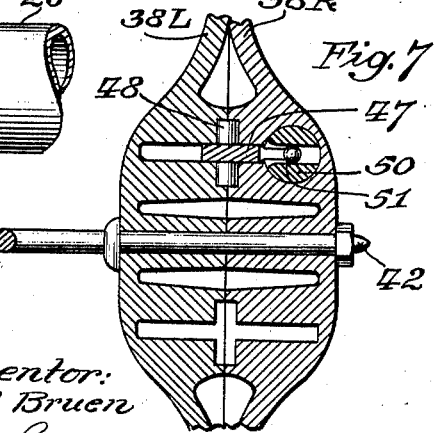
Inventor:
George C. Bruen
By Williams, Bradbury,
McCaleb & Hinkle
Attys March 18, 1941. G. C. BRUEN 2,235,736
ROTARY CARD INDEX
Filed Oct. 14, 1937 8 Sheets-Sheet 5
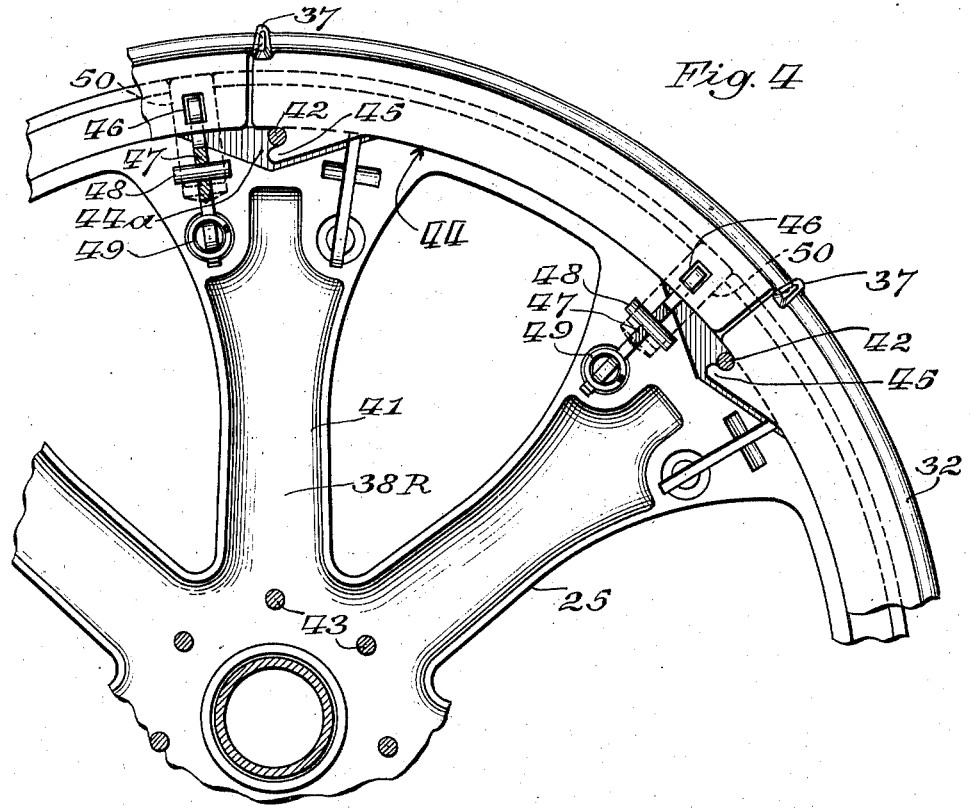
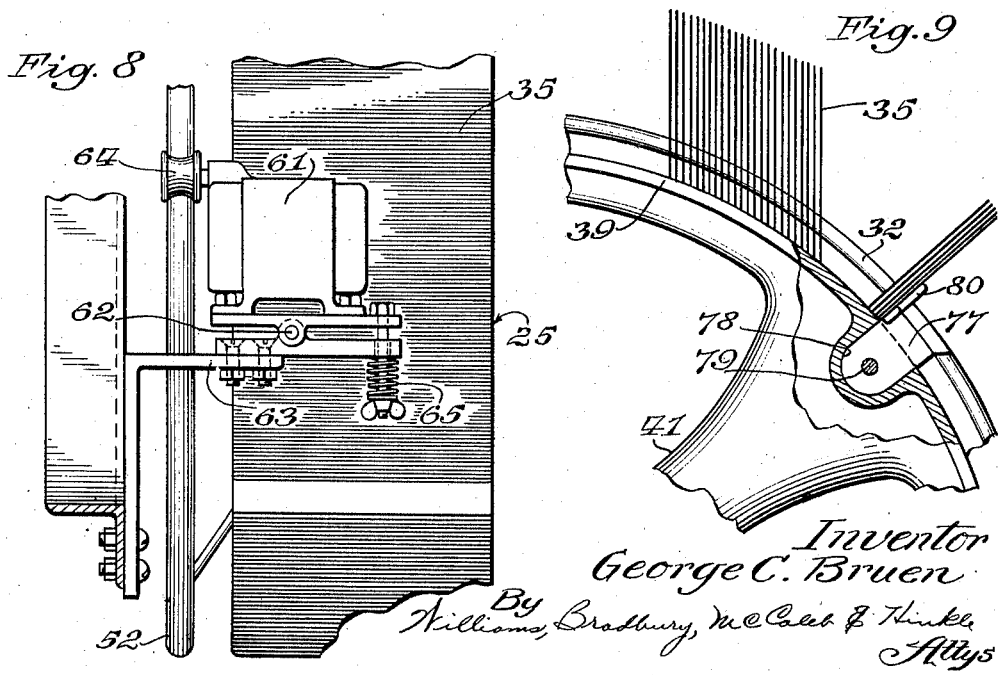
Inventor
George C. Bruen
By Williams, Bradbury, McCaleb & Hinkle
Attys

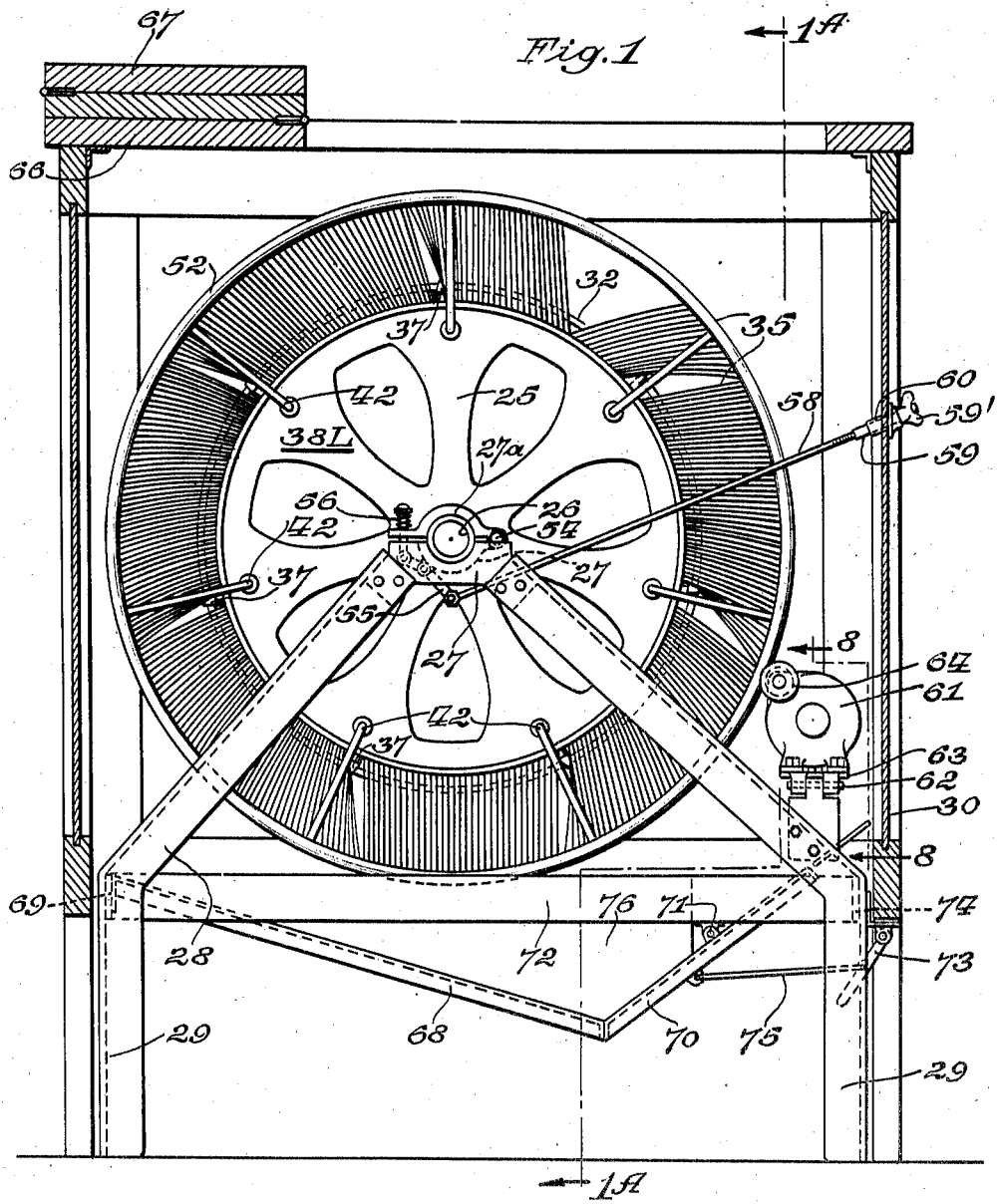

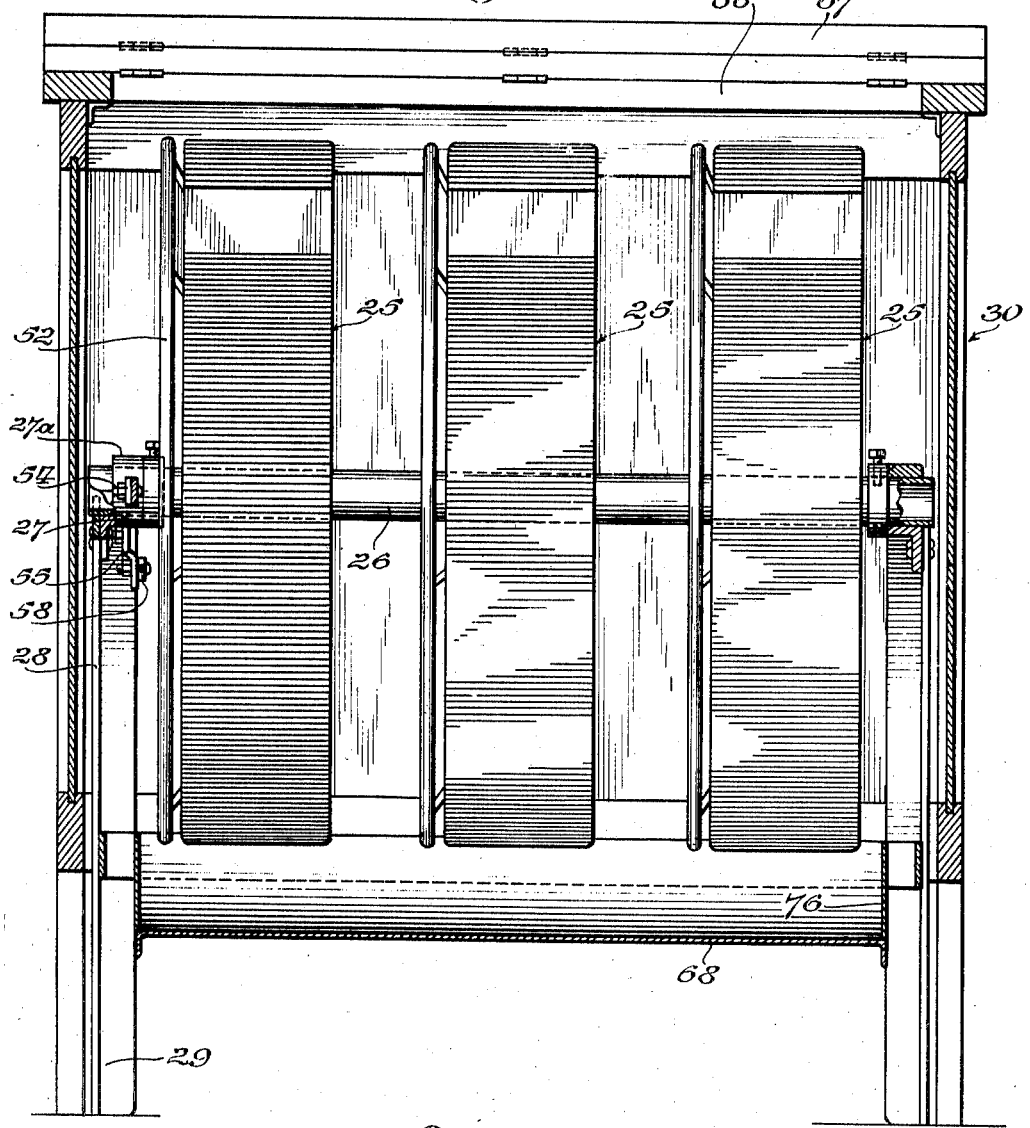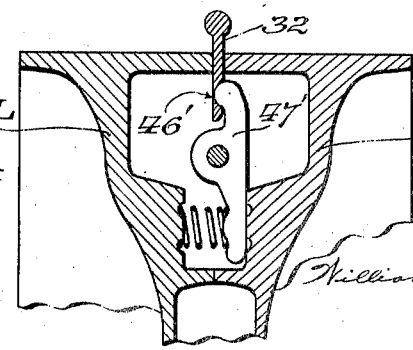

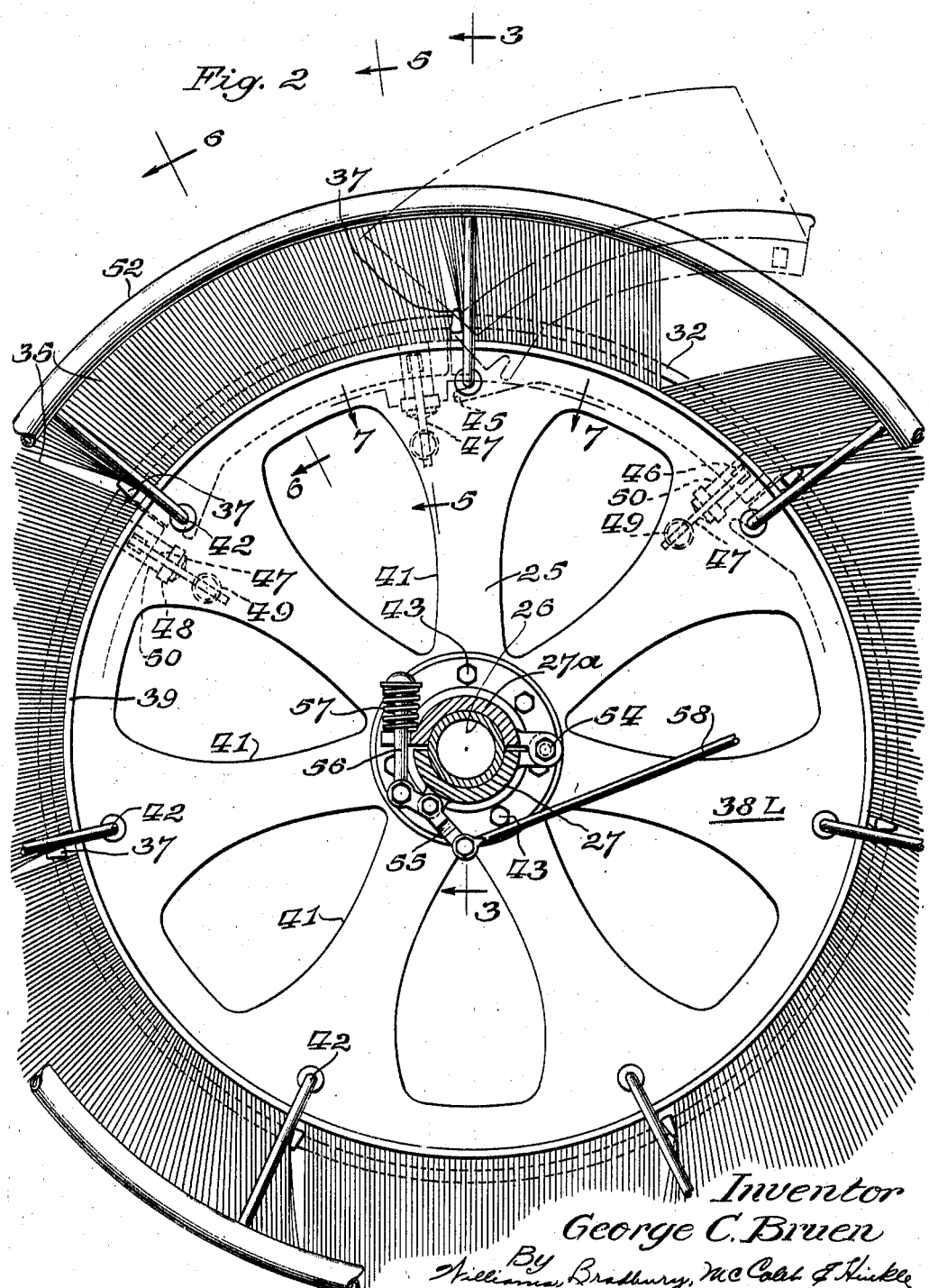

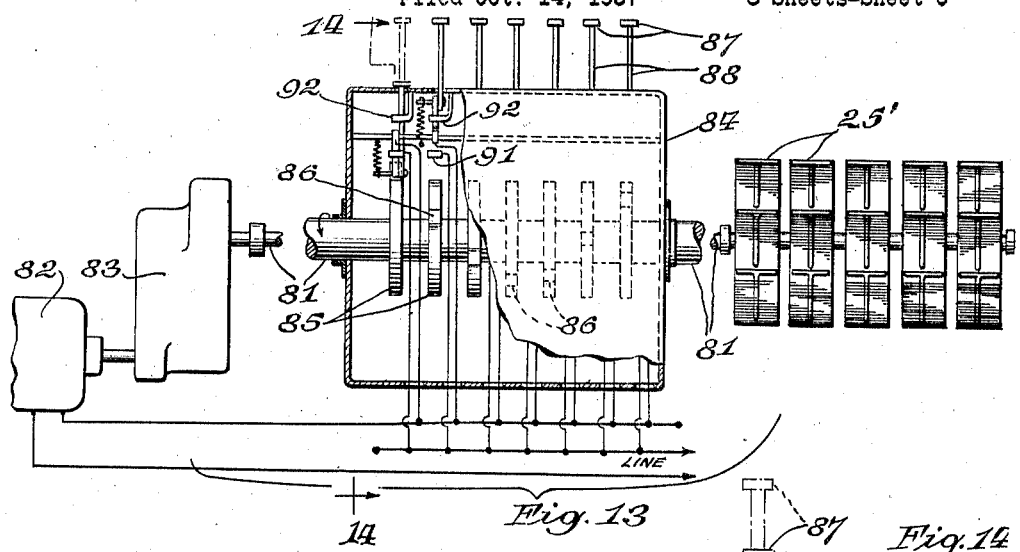
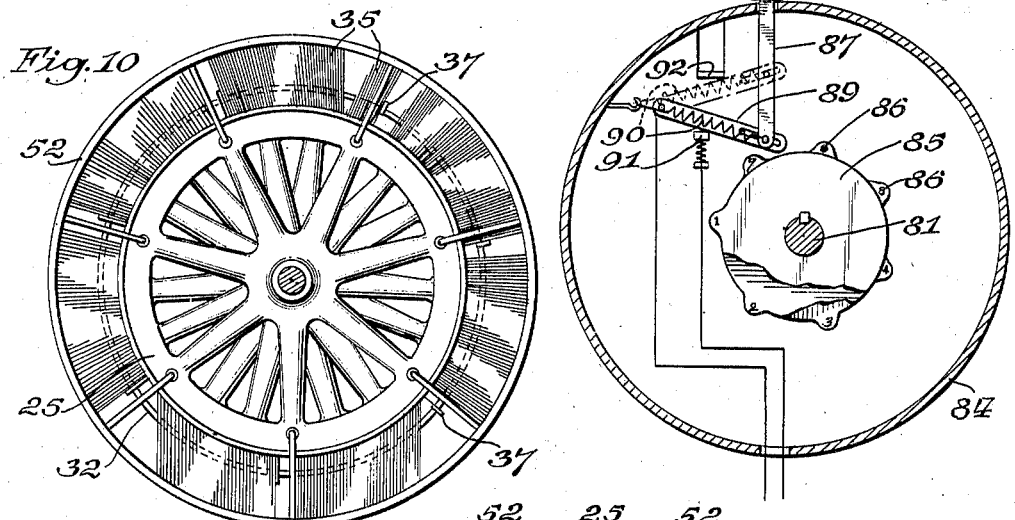
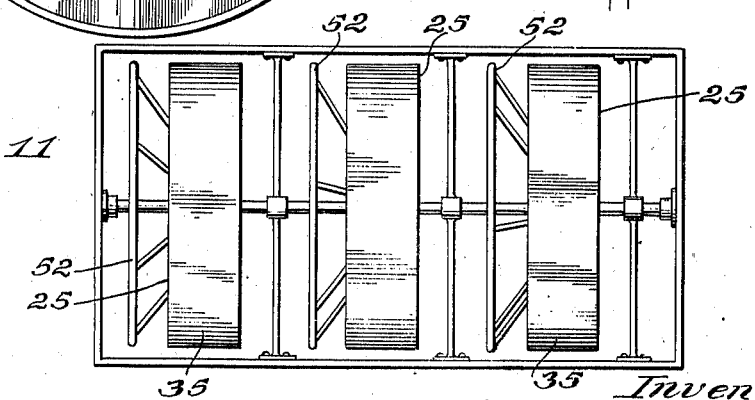

March 18, 1941.  G. C. BRUEN  2,235,736
ROTARY CARD INDEX
Filed Oct. 14, 1937  8 Sheets-Sheet 7

Inventor
George C. Bruen
By Williams, Bradbury, McCaleb & Hinkle
Attys

March 18, 1941.        G. C. BRUEN        2,235,736
ROTARY CARD INDEX
Filed Oct. 14, 1937        8 Sheets-Sheet 8
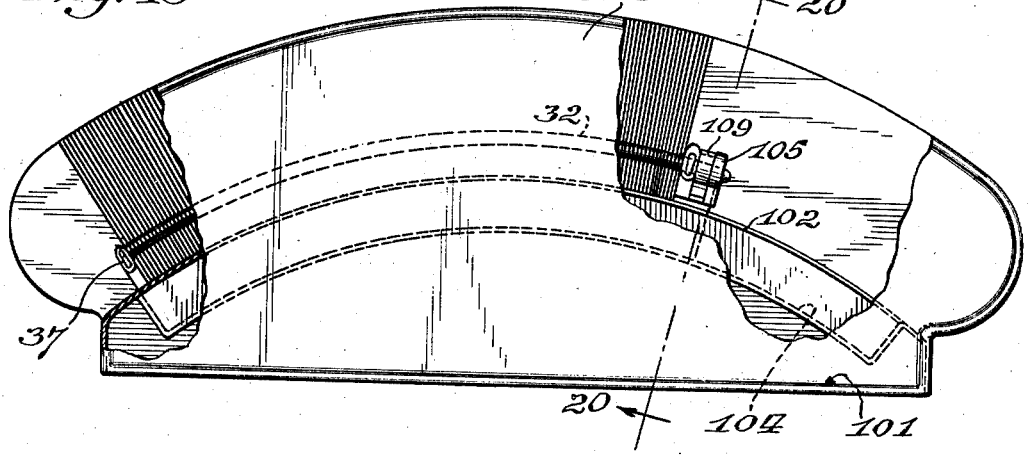
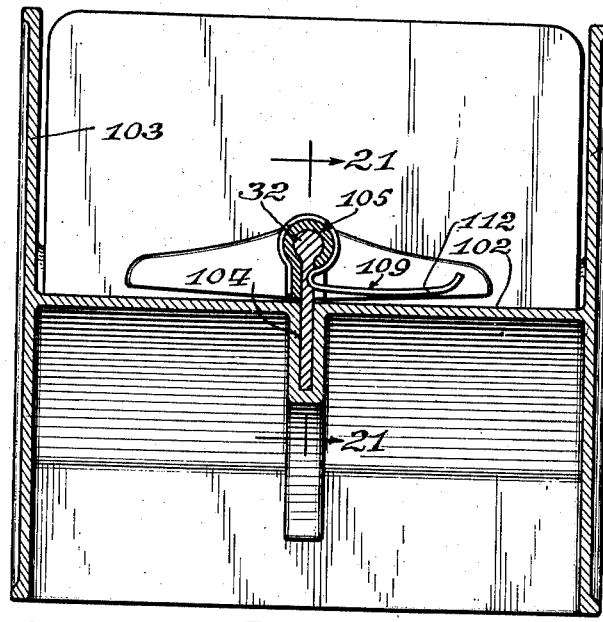
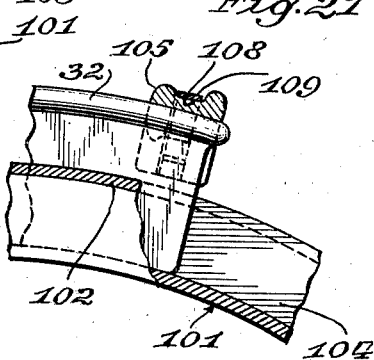
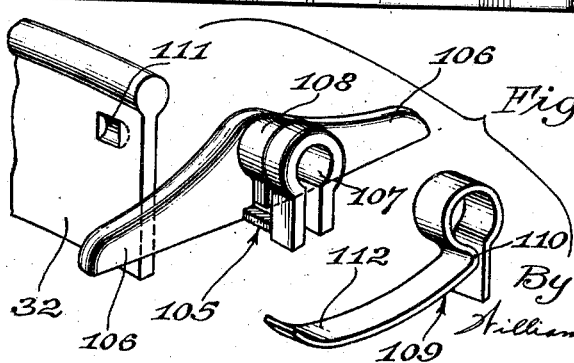
Inventor
George C. Bruen Patented Mar. 18, 1941

2,235,736

UNITED STATES PATENT OFFICE 2,235,736

ROTARY CARD INDEX

George C. Bruen, Chicago, Ill., assignor to Rotary Index Co., Inc., Chicago, Ill., a corporation of Illinois Application October 14, 1937, Serial No. 168,993

18 Claims. (Cl. 129—16)

My invention relates to rotary card indexes. Many aspects of my invention are especially concerned with a rotary card index of the type where the cards are arranged more or less radially of the mounting drum or wheel on a rail carried thereby.

My present invention constitutes an improvement over that set forth in my application Ser. No. 718,126 filed, March 30, 1934, issued August 8, 1939, as Patent No. 2,168,323.

Among the objects of my invention are: a more unitary and compact structure for the mounting wheel to provide a minimum number of parts and greater ease of assembly, despite the incorporation of convenient latches for holding the removable card rails on the wheel; an improved form of release for the mounting of the card carrying rails upon the wheel, and especially one where the release may be effected by pressing the finger upon a button upon the periphery of the wheel drum in a position convenient for one hand operation when the fingers are in position to lift a section of the rail, with cards thereon, from the wheel; a more convenient hand pull for rotating the wheel and a simplified mounting therefor; a better solution of the problem of the tendency of the wheel to back-roll after it has been rotated to the desired position, due to the unbalancing effect of the accumulation or packing of cards as they ride on the mounting rail; an improved and more convenient cabinet for housing the index; power means for rotating the wheels—especially when they are mounted in gangs—to bring any preselected group of cards to inspection position; provision for readily adopting a bank of wheels to use of left handed operators as well as right handed operators, or to permit a bank of wheels to be inspected by operators working on both sides thereof; and a below-counter mounting for the index wheel which will permit inspection of the cards from the top of the counter without impairing the full use of the counter top.

The foregoing, together with further objects, features and advantages of my invention, are set forth in the following description of specific embodiments thereof as illustrated in the accompanying drawings, wherein:

Fig. 1 is a transverse vertical section through a cabinet, showing one form of my wheel, with the cards mounted thereon, in side elevation;

Fig. 1A is a front elevation of a set of three wheels fixedly mounted on a common shaft, and taken on the line 1A—1A of Fig. 1;

Fig. 2 is a similar side elevation of the wheel, but on an enlarged scale and on a plane a little closer to the wheel to reveal in cross section the adjustable friction device tending to hold the wheel against free rotation;

Fig. 3 is a vertical section longitudinally of the axle, but transversely of the wheel, taken on the line 3—3 of Fig. 2;

Fig. 4 is a transverse section, taken on the line 4—4 of Fig. 3, along the split medial line of the wheel, showing one of the die-cast halves thereof;

Fig. 5 is a section similar to the upper portion of Fig. 3, but taken on a plane slightly spaced therefrom, along the line 5—5 of Fig. 2, showing the latch and release for one of the rail sections;

Fig. 5A is a view similar to Fig. 5, but showing a modified form of latch;

Fig. 6 is a typical transverse section of the rim of the wheel, taken on the line 6—6 of Fig. 2;

Fig. 7 is an arcuate plan section, taken on the line 7—7 of Fig. 2;

Fig. 8 is a fragmentary front elevation of the motor drive, as viewed from the line 8—8 of Fig. 1;

Fig. 9 is a fragmentary view of the periphery of a card mounting wheel, partly broken into section to reveal an alternative means for removing a group of cards en bloc;

Fig. 10 is an end elevation of a gang mounting of a plurality of wheels, showing their fixed relative arcuate offsetting;

Fig. 11 is a somewhat diagrammatical plan view of a gang mounting of the wheels shown in Fig. 10;

Fig. 13 is a conventionalized elevation, on three different scales, of a set of concentrically mounted wheels with a preselector mechanism for rotating the wheels to bring the desired groups of cards to inspection position;

Fig. 14 is a transverse section of the selector mechanism, taken on the line 14—14 of Fig. 13;

Fig. 19 is a side elevation, partly broken into section, showing a desk tray for receiving an arcuate rail section with cards thereon;

Fig. 20 is a transverse section, taken on the line 20—20 of Fig. 17;

Fig. 21 is a detail section, taken on the line 21—21 of Fig. 20, showing a clip to prevent the cards from moving off the end of the rail section; and Fig. 22 is a bracketed perspective view of the end of the rail section, the end guard, and the retaining clip therefor, prior to assembly.

Figure 17:
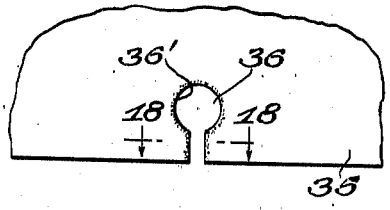
Fig. 17 is a view of the lower central portion of a card, showing a reinforcement for the margins of the keyhole-shaped mounting slot therein.

Referring especially to Fig. 1, I have shown a card mounting wheel 25 fixed upon a horizontal shaft 26 journaled in bearings 27, which in turn are carried by a frame 28. At each side of the wheel the frame consists of upright leg portions 29 formed from angle bars, which at their upper ends extend upwardly and inwardly to the bearing 27 on the adjacent side of the wheel. In this way the wheel is mounted primarily on its frame, which rests upon the floor. The wheel, together with its frame, is housed by a cabinet 30, which is set down over the wheel and frame and positioned in reference to the frame by virtue of the leg portions 29 of the frame coming along the inside corners of the cabinet.

One advantage of this arrangement is that the cabinet may be lifted entirely free of the wheel, leaving the wheel readily accessible for any changes or repairs. Another advantage is that the cabinets may be stocked separately, and a standard wheel and frame may readily be housed in any desired type or finish of cabinet.

If desired, as shown in Fig. 1A, a plurality of wheels 25 may be fixedly mounted on the common shaft 26 whereby all the wheels turn together.

The wheel 25 presents a cylindrically conformed peripheral face 31, and a peripheral card carrying rail is mounted at the medial line thereof. The rail is formed by a set of seven arcuate sections 32. Each rail section comprises a head 33 and flange 34, which extends into a slot in the face 31 (Figs. 5 and 6). Each card 35 has a keyhole-shaped slot 36 in its lower edge, as best shown in Fig. 17. That portion of the rail which protrudes beyond the drum face 31 is received within the slot 36 of each card. A plurality of parallel spaced rails may be employed with similarly spaced keyhole slots in the card, if desired, as disclosed in my previously mentioned application.

One end of each rail section 32 carries a partition or stop 37. While the cards are free to ride on the rail and drum face, they are limited in their migration by the stops 37. When the wheel is pulled forwardly (clockwise, Fig. 1), the cards tend under gravity automatically to form a V opening a few inches forwardly of the vertical plane of the axis. This tends to lighten the forward side of the drum. At the same time, under the action of gravity and the slight shifting allowed the cards, even when the wheel is normally full, an excess concentration or packing of cards builds up diametrically opposite the V opening. As the result of these two phenomena, the wheel tends to become unbalanced and roll backwardly a few degrees.

One important advantage of the use of the stops 37 is to limit the shifting of cards to a relatively short arcuate space—one-seventh of a circle in this case. The larger the number of arcuately spaced partitions used, the less is the shifting of the cards, and consequently the less the problem of back-roll.

Assuming the cabinet of Fig. 1 to be of desk height, I find the use of seven rail sections, each with a partition at its end, satisfactory in minimizing the tendency to back-roll. In smaller wheels a lesser number of partitions is necessary, and in larger diameters of wheels a greater number is advisable.

The partitions 37 are preferably very low—scarcely higher than the rail head, and need not be as wide as the cards. In this way their presence does not materially interfere with the articulation of the cards upon the rail as they successively flip from a substantially vertical position at the rear side of the V opening to a substantially horizontal position at the front side of the V opening as the wheel is rotated forwardly.

As a preliminary to explaining in greater detail how the rail sections are mounted in the wheel and releasably secured thereto, I shall explain the structure of the wheel. Preferably the wheel is die-cast in two parts: a right half 38R and a left half 38L, which are identical as far as the castings are concerned, although slightly different in the machining. This makes for lower production costs.

In general, the wheel comprises a rim 39, a hub 40, and a set of seven hollow spokes 41. At the outer end of each spoke and just within the rim the two halves are held together by rim assembly bolts 42. Somewhat similarly, at the inner ends of the spokes the two halves are held together by hub assembly bolts 43. The juxtaposed edges of the rim portions of the wheel halves are spaced apart to form a slot 44 for receiving the flanges 34 of the rail sections. To reduce the weight of the metal, the slots inwardly of the drum face 31 may be hollowed out.

The slot 44 is deepened as indicated at 44a, at the region of each rim assembly bolt 42, whereby, as best shown in Fig. 4, the slot embraces all sides of each rim bolt at the plane of the slot 44. The purpose is to provide clearance for a hook-like ear 45 extending inwardly from the flange 34 of the adjacent rail section. The slot or bight formed by the hook-like ear extension 45 receives the adjacent rim assembly bolt 42, whereby the bolt holds the adjacent end of the rail section against moving outwardly from the slot 44. Preferably the ear 45 is at the same end of the rail section as is its stop 37.

Adjacent the end of each rail section, opposite the end which carries the ear 45, the rail flange 34 is pierced by a latch hole 46 (Fig. 4). This enables the latter end of the rail section releasably to be held in place by a latch 47, best shown in Fig. 5.

As shown in Figs. 4, 5 and 7, the latch 47 carries trunnions 48 projecting on opposite sides thereof. These trunnions are journaled in a bearing conveniently formed by appropriately hollowing out the adjoining mating faces of the two wheel halves, as they are die-cast. In this way the latch is journaled about an axis in the plane of the split between the two wheel halves. The latch and its associated operating members are conveniently housed within a hollow space provided at the outer end of the adjacent spoke, where its conformation bells out to meet the rim. By this expedient a pleasing external appearance is given the wheel, which effectively hides the latch mechanism.

A latch spring 49 is interposed between the lower end of the latch and an appropriate seat on the inner face of the left wheel half, and releasably urges the nose of the latch into the latch hole 46 to retain that end of the rail section against outward movement. The outer edge of the latch nose is obliquely profiled so that when the rail's flange is pressed into the slot the latch will be cammed against the pressure of the spring 49 to permit the edge of the rail flange to enter to the bottom of the slot 44, whereupon the latch will snap into the latch hole 46. The release of the latch is effected by pressing on the outer end of a plunger 50, which is slidably mounted in a radial bore extending inwardly from the drum face 31. The latch 47 includes a bell-crank extension terminating in a balled head 51, which enters a transverse bore in the plunger 50.

When a given rail section is to be removed, the operator may conveniently, and as a one-hand operation, grasp the rail section near the right hand end (Fig. 4), and just below the rail head, between the thumb and forefinger of the left rand, and with the second finger press down on the end of the plunger 50. This rocks the latch 47 to released position so that the operator may pull the grasped end of the rail section upwardly, pulling the ear 45 at the other end of the rail out of engagement with the bolt 42. With a continued upward pull the rail section comes entirely out of the slot in the drum face, with its quota of cards still mounted on the rail. The stop 37 keeps the cards from dropping off one end, and the operator's thumb and forefinger keep the cards from running off the other end.

In the modification of Fig. 5A, the margin of the latch slot 46' in the rail flange is cammed and the hook of the latch 47' is rounded, whereby the rail may be withdrawn against the pressure of the latch spring and the release plunger 50 omitted. The rail section may then be placed in a suitable desk tray provided for the purpose. All or any number of the cards may then be removed endwise from the rail section, re-arranged, or replaced as necessary.

Another way of removing some or all of the cards en bloc endwise from the rail section is to release the latch by the finger plunger 50 and lift that end of the rail section only an inch or two so that the cards can clear the stop 37 at the end of the adjoining rail section. A complete removal of the rail section from the drum is not necessary in order to load or unload cards over the end of the rail section.

I might explain at this point that individual cards or groups of two or three cards may also readily be removed from or placed on the rail section by flexing the margins of their keyhole slots over the rail head and without passing over the end of the rail. As a matter of usual practice, the cards are thus flexed into shape individually or in very small groups, as occasion demands, while the end removal is resorted to only for mass removal of cards.

Because the rail sections are all interchangeable, rail sections, together with cards thereon, may be taken from the wheel and put on suitable stationary racks for dead storage, which another group of cards on another section may be set back in the wheel. In this way a large volume of card records may be stored and each group of cards brought out for intensive inspection or posting say once every thirty days, while requiring but a relatively small number of wheels.

With a wheel of the size indicated, about 5,000 cards of ordinary card record weight may be mounted upon each wheel. To find a desired card, the wheel is rotated—preferably being pulled forwardly. As the cards come into a convenient position for visual inspection, they fan themselves into the V opening, successive cards falling down across the opening as the wheel is rotated. In this way each card, when inspected, is at the optimum position for convenient inspection or individual removal, as for posting entries. The fanning action of the cards also exposes the upper margin of a large portion of the cards as the wheel is rotated, making it very easy to find the desired card and know when to stop rotating the wheel. I shall later explain how the wheel is held at its turned position against any tendency to roll back.

For turning the wheel I provide a tubular pull ring 52. The radius of the pull ring is such that its outer edge comes approximately to the height of the tops of the cards. This makes it a convenient rest for the operator's hand in fingering the cards. It tends to keep the card edges cleaner and reduce the wear on them. The tubular pull ring forms a convenient means of turning the wheel, and it is of sufficient radius to give an easy pull to the wheel. The pull ring is conveniently supported by extending one end of each rim assembly bolt 42 to the left side of the wheel, and then upwardly and somewhat obliquely into a threaded bushing in the pull ring. Thus the rim bolts 42 serve the threefold function of holding the two halves of the wheel together, forming pivot-like anchors for the retaining ears 45 of the rail sections, and spokes for the pull ring.

Figure 12:
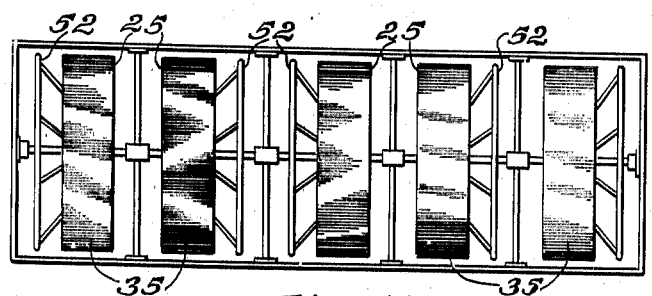
Fig. 12 is a plan view of a battery of wheels somewhat like Fig. 11, but where the wheels are mounted for independent rotation.

The spokes, as well as the pull ring, are set a spaced distance laterally beyond the near edge of the rim face. This enables me—without increasing the width of the rim face—to use over-size cards—that is, cards longer than the width of the rim face—or to offset cards, as in posting, if the slots in the cards be off center a fraction of an inch as shown in Fig. 12 of my Patent No. 2,168,323. In either case the cards will clear the spokes. The radial distance between the rim face and the pull ring is left open for convenient sidewise visual inspection or digital manipulation of the cards through the open space.

Attention is called to the ease and simplicity of assembly afforded by my design. In practice the bolts 42 are first screwed into the bushings in the pull ring, then the pull ring is set on a bench top, with the free ends of the bolts 42 extending upwardly. Then the left half 38L of the wheel is set into position on the bolts 42. Next, the springs 49 are positioned in their seats, and the latches 47 are set with their trunnions in the halves of the trunnion bearings formed by the wheel half 38L. The other half 38R of the wheel is then set in horizontal position, the plungers 50 inserted in their bores, with the outer ends of the plungers flush with the drum face 31. The wheel half 38R is then lifted into register with the wheel half 38L, and, guided by the upwardly protruding ends of the bolts 42, set into position on the left half of the wheel. The balled ends of the bell crank projections 51 of the latches 47 easily find their way into their cross bores with the aid of the belled mouths of the cross bores. The clamping nuts are then screwed onto the bolts 42, and the rim bolts 43 applied. The axle is then slipped through the wheel hub and retained by a threaded locking pin 53.

The pull ring 52 is here shown as mounted on the left side of the wheel because that is more natural and convenient for a right handed operator. The cards are mounted so that the alphabetical or numerical indexing runs from the front or latch end of each rail section to the stop end. To adapt the wheel to the convenience of a left handed operator, the clamping nuts are removed from the several rim assembly bolts 42, but the bolts are left attached to the pull ring and the bolts are re-applied to the wheel, but from the right side. The wheel assembly is preserved during this change-over by the hub assembly bolts 43.

The previously mentioned problem of the tendency of the wheel to roll back after being rotated to the desired position, is solved by three expedients: First, I use the arcuately spaced stops or partitions 37 to confine the shifting of the cards to reasonably short sections. Second, I use an odd number of stops 37, which seems to aid to a certain extent, perhaps because no two stops are diametrically opposite, and hence the point of greatest concentration of cards does not come quite diametrically opposite the V opening, which is the lightest point. Third, I subject the axle, as it is journaled in the bearings, to a certain degree of friction. This bearing friction, although adjustable, is a continuous friction applied at all times, whether the wheel is at rest, rotating forwardly, or rotating backwardly. I eliminate the necessity of an over-running clutch or other mechanism to provide a one way friction.

Inasmuch as the tendency to roll backwardly has been very greatly minimized by the use of a plurality of arcuately spaced stops 37, the remaining tendency to roll back is checked by a relatively light friction secured by the bearing friction. This is made readily adjustable so that it can be increased or diminished as necessary, and thereby the frictional resistance to the pull of the wheel is no more than is necessary to prevent roll-back of the wheel. Sometimes the wheel becomes more unbalanced because certain rail sections will contain more cards than other rail sections, and in that event it is often desirable to increase the bearing friction somewhat.

An important advantage of the use of this continuous friction on the bearing to check the roll-back is that it is equally effective, whether the wheel has been pulled forwardly or pushed rearwardly. Sometimes it is more convenient to push the wheel backwardly a few degrees to inspect a nearby card than to pull it forwardly through the greater portion of a revolution. In that event, whatever tendency there is to roll back will be in the opposite direction and, strictly speaking, a tendency to roll forwardly. By my continuous friction, the tendency to roll in the opposite direction, after the wheel has been brought into position, is thwarted equally well, whether the wheel has been brought to its position by pulling it forwardly or pushing it rearwardly. In many instances the cards on the wheel will be inspected by the operator when standing at the rear of the wheel, and in that event what would be a forward pull to the operator would be what would ordinarily be considered a backward pull. Here again my continuous friction serves effectively to check the tendency to roll in the opposite direction.

Expedients for applying this continuous friction may be many and varied, and does not necessarily have to be incorporated in the shaft bearing. I have shown a simple arrangement for providing the friction, incorporated in one of the bearings. Referring to Fig. 2, the bearing 27 is formed in halves. The lower half is stationary on the frame. The upper half 27a is pivoted to the lower half at 54. A bell-crank 55 is pivoted on the lower bearing half and serves to pull downwardly a pin 56 which extends through an offset ear at the end of the upper bearing half 27a diametrically opposite the pivot 54. An expansion spring 57 is interposed between the head of the pin 56 and the ear of the pivoted bearing half.

The other arm of the bell-crank 55 is connected to a tension adjusting rod 58. As shown in Fig. 1, the rod 58 extends somewhat obliquely to the front panel of the cabinet, where its end is threaded for reception in a sleeve 59, which is journaled in a bearing 60 set in an opening in the front panel of the cabinet.

The forward end of the bushing 59 is exposed at the front of the cabinet and carries wings 59'—like a wing nut—so that the operator may readily turn the bushing 59 to put the spring 57 under greater or lesser tension whereby the friction of the bearing is correspondingly increased or decreased. It is not necessary that the bearing on both sides of the wheel be thus split to provide friction. It suffices to do that with only one bearing. The fact that one bearing is split, however, enables its top to be opened up (after the tension of the spring 57 has been sufficiently relieved). Then the shaft can be axially slid out of the other bearing and lifted out of the friction bearing. This makes a convenient method of removing the wheel from the frame.

Ordinarily a single wheel may be easily rotated by hand by means of the pull ring 52. It may also be turned by power, and this is especially desirable where a plurality of wheels are co-axially mounted to rotate together. Such a power drive is illustrated in Figs. 1 and 8, where a motor 61 with built-in gear reduction is pivotally mounted at 62 on a bracket 63 carried by the frame 28. The motor has a rubber faced drive pulley 64, the face of which is somewhat grooved frictionally to contact the periphery of the pull ring 52. The drive friction may be varied by adjusting the tension on the spring 65.

The motor may conveniently be controlled by a pedal rheostat—in much the same manner that sewing machine motors are controlled—and, if desired, a reversible motor may be used to drive the wheel in reverse direction, using a double rheostat in the pedal control. The pedal rheostat is not shown in the drawings.

The top 66 of the cabinet may include a plurality of leaves 67 so hinged together that they may be folded at the back of the top, exposing convenient working access to the wheel. When the wheel is not in use, the hinged leaves are brought out into the plane of the top so that the cabinet may be used as a counter. Closing the top also checks the collection of dust during periods of non-use. It is desirable also to have a bottom for the cabinet. When, as is here shown, the cabinet is merely a shell which sets over the wheel and its independent supporting frame, the bottom is preferably carried by the frame, rather than by the cabinet. The bottom here shown comprises an obliquely mounted fixed portion 68 of sheet metal secured at its rear edge to the rear rail 69, which connects the front and rear portions of the frame. The bottom is completed by a damper-like sheet metal portion 70, pivoted at 71 on the side rails 72 of the frame. This movable or damper-like portion may be opened to discharge papers, etc., which fall inside the cabinet and gravitate to the low point of the bottom, by means of a trip lever 73 pivotally mounted on an angle bracket carried by the front rail 74 of the frame.

The trip lever 73 is connected to the movable portion 70 of the bottom by a link rod 75. The cabinet may be lifted entirely free of the wheel and its supporting frame merely by unscrewing the threaded sleeve 59 from the end of the tension adjusting rod 58. The floor and its damper-like closure remain on the frame. The triangular space at each side of the bottom, below the side rails 72 of the frame and below the bottom edges of the side panels of the cabinet, may be conveniently closed by turning up a properly contoured vertical wall 76 from the sheet material of the fixed portion 68 of the bottom.

In Fig. 9 I have shown another expedient for permitting endwise loading or unloading of the cards from the rail sections. The rail sections themselves in this case need not be removable from the wheel, and in fact the major portion of the rail sections may be formed integral with the rim of the wheel. At spaced distances along the rail, gaps are left which are filled by removable slug-like portions 77, which are of the same cross section as the rail, and when in position virtually form continuations of the rail sections.

The flange of each slug 77 extends into a slot 78 formed in the face of the drum and is removably secured by a cross pin 79. Stops 80, somewhat similar to the stops 37, are provided at each slug position to keep the cards from running off one rail section when the slug is withdrawn for removal of cards endwise from the adjacent rail section. The stop 80 may be carried either by the stationary rail section or by the slug 77; the latter arrangement is here shown.

When the pin 79 is withdrawn and the slug 77 removed, blocks of cards may be removed from or added to the rail section over the end thereof. The number of cards removable at one time is, of course, determined by the arcuate length of the slug 77.

In Fig. 11 I have shown a battery of wheels mounted on a single shaft. Increasing the size of the shaft may be avoided by providing bearings intermediate the wheels as well as at the ends. The wheels are locked to the shaft, however, so that they turn together. As shown in Fig. 11, the battery of wheels is enclosed by an open topped cabinet. As indicated in Fig. 10, which is an end elevation of the battery of wheels of Fig. 11, the wheels are set on the common shaft so that their rail sections and their stops 37 are arcuately staggered as between the different wheels. When this relationship is applied to a set of say three wheels, as illustrated in Fig. 11, fixed on a common shaft, the tendency to roll back is much less than if the three wheels were mounted with their stops aligned. Consequently, there is less need to employ any form of friction to hold the assembly wheels against rolling back.

In Fig. 12 I have indicated a battery of wheels mounted in axial alignment, but with this difference over the arrangement of Fig. 11: the wheels are not locked together on a common shaft, but each is mounted on its own stub shaft so that it can rotate independently of the other wheels. The frictionally adjustable bearings being openable at the tops, any wheel can be lifted out and turned around to bring its pull wheel to the right. Then some operators can be placed on the back side of the cabinet and some operators on the front side. This would be desirable during rush periods where intensive work had to be done on the files. At other periods the wheels can be set so that all of their pull wheels come on the left side to be served by one or two operators working wholly from the front.

In Figs. 13 and 14 I have shown a power drive and automatic selector whereby a wheel, or a group of wheels fixed on a common shaft, may be rotated to bring any desired card section into convenient position for inspection. I have here shown a set of five wheels 25' fixedly mounted on a common shaft 81 so that they rotate together. Inasmuch as these wheels are rotated by power, the pull rings are eliminated. In this case the set of wheels are not shown as mounted in arcuately offset relation, because I want the figure to illustrate another arrangement of continuity for the cards. Ordinarily the card continuity runs rearwardly from the front of one rail section to the back of that rail section and then immediately continues rearwardly on the rail section rearwardly adjoining the one section. Fig. 13 is intended to indicate another card arrangement where a card which follows—either alphabetically or numerically—the card at the end of the uppermost rail section on the first wheel is not the first card on the rail section on that wheel rearwardly of the uppermost section. Instead it is the card at the front of the uppermost rail section on the second wheel. From that rail section the cards continue on the uppermost rail section of the third wheel, and so on across the uppermost rail sections of the successive wheels. From the rear of the uppermost rail section on the last wheel, the cards continue in order with the cards at the front of the rail section on the first wheel rearwardly of the uppermost section. In other words, the cards are "filed across the bank of wheels."

By this arrangement, wherever the wheel is stopped, there is presented to the operator's inspection a set of five parallel, side-by-side groups of cards in much the arrangement that would be found in the so-called "tub" file. To bring the succeeding cards into view, the set of wheels is rotated forwardly the arcuate distance of one section, whereby another set of sections is exposed.

Assuming wheels of the size indicated in Fig. 1, each rail section would carry about 700 cards. In the arrangement of Fig. 13 at each arcuate position there would be some 3500 cards simultaneously in position for ready inspection by the operator, and by turning the wheels to bring successive rail sections into place, a total of some 25,000 cards are made readily available to the operator in a comparatively compact volume.

The selector control mechanism illustrated in Figs. 13 and 14 is arranged as follows: The common shaft 81 on which the wheels 25' are fixedly mounted, is supported in suitable bearings and driven by a motor 82 through a gear reduction in the housing 83.

Any suitable automatic control and pre-selector mechanism may be employed; the one here illustrated is merely exemplary. The shaft passes through a control box 84. Within the control box the shaft fixedly carries a plurality of cam discs 85. There are as many cam discs as there are rail sections in each wheel—seven in this instance. Each cam disc 85 contains a cam ear 86, the cam ears of the respective discs being arcuately spaced as shown in Fig. 14 in accordance with the arcuate spacing of the rail sections.

Keys 87 bearing suitable indices, are exposed above the control box and their shanks 88 extend downwardly through bearing openings at the top wall of the control box and are pivoted at their lower ends to key levers 89. Each key lever is pivoted at its other end to a suitable stationary support. A tension spring 90 is interposed between a suitable stationary hook and a pivotal connection of each key shank 88 with its key lever 89. In this way the key levers 89 either assume the full line position or the dotted line position of Fig. 14.

Normally they are in the dotted line position. When one key 87 is depressed, its associated metallic lever 89 is snapped to its lower position where it is pressed by the spring 90 against the contact 91, thereby completing the circuit of the motor. Each lever 89 when in its lower position, extends into the path of the cam ear of the associated cam disc 85. As the motor continues to rotate the shaft, the cam ear for the associated cam disc will contact the depressed cam lever 89, camming it upwardly past its dead center position, whereby it will snap to its upper or off position, breaking contact with the spring pressed contact 91 and resting against the stop 92. This will happen when the wheels have been rotated to bring the pre-selected rail sections to the top.

Figure 15:
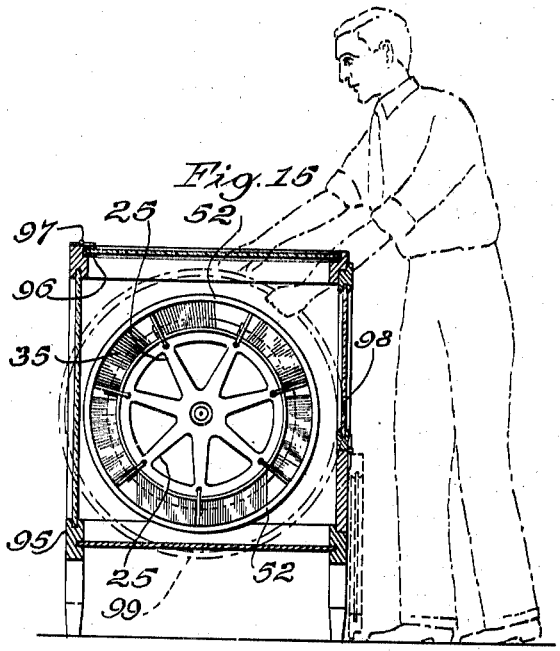
Fig. 15 is a transverse section through a glass-topped cabinet for mounting an index wheel, shown in elevation.
Figure 16:
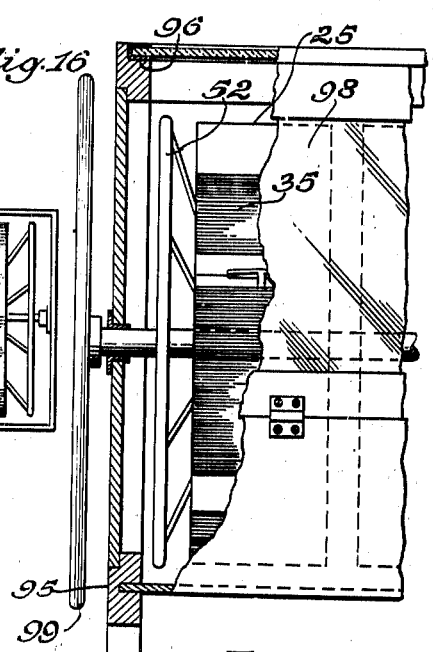
Fig. 16 is a front elevation of the modification of Fig. 15, with part of the cabinet broken into sections.

In Figs. 15 and 16 I have shown a modified form of cabinet for one or more wheels 25. The cabinet 95 includes a glass top 96, the marginal frame of which is hinged at 97 at its back edge to the rear edge of the cabinet, so that it can be swung upwardly, if desired, for downward access to the cards. Ordinarily, however, the cards are visually inspected through the transparent glass top, but they are manipulated by access through the front of the cabinet. For this purpose, a portion of the front panel 98 of the cabinet is hinged so that it can be swung down to the dotted line position of Fig. 15. The operator may then pull the ring 52 by reaching through the opened front. He may also reach through the front for manipulating the cards, inspecting them through the glass top. This leaves the glass top free for working space. In addition to the pull ring 52 within the cabinet—or instead of the pull ring 52—the shaft may be extended through the end wall of the cabinet and carry an outside pull ring 99. The outside pull ring 99 may be of even larger diameter than the inside pull ring 52 and this is of advantage where a plurality of wheels are mounted on a common shaft within the cabinet.

Figure 18:
Fig. 18 is a section through the slot of the card, taken on the line 18—18 of Fig. 17, but on a larger scale.

In Figs. 17 and 18 I have illustrated a reinforcement for the margins of the keyhole shaped slots 36 in the cards, whereby the margins better resist wear. The stock ordinarily used for index cards is strong enough satisfactorily to resist the incidental wear, and this reinforcement is for use chiefly with cards of extremely light or cheap stock.

This reinforcement consists in applying a thin film of glue, sizing or the like 36', to the surface of the margins of the slot 36. The glue penetrates the fibers so that it is more than a surface film. When it is set, it is harder and more wear-resisting than the paper stock itself. This is preferably applied in the process of cutting the slots and may be effected by allowing a film of melted glue to gravitate down the male cutting die, heat being applied to the margins of the slot shortly thereafter to set the glue quickly before it causes adherence to other cards.

In Figs. 19 to 22, I have shown a tray suitable for desk use, into which a rail section, removed from the wheel with the cards thereon, may be set.

This tray 101 comprises an arcuate floor 102 of a little more than the width of the cards, side walls 103 extending from the desk up to the height of the cards, and a slot 104 formed along the middle of the floor for reception of the flange of the rail section. The tray floor and the bottom of the slot 104 are arcuate and of radii corresponding to the analogous parts of the wheel. The tray floor, therefore, coacts with the cards and rails in the same manner as the drum face of the wheel. The slot 104 is preferably about a third longer than the length of the rail section, whereby the rail section may be slid to the forward or rearward end of the slot. For inspecting the forward cards, the rail is preferably slid to its rearward position, as in Fig. 19; when the rearward cards are to be inspected, the rail section is slid to its forward position. In this way the cards being inspected are more nearly vertical. This sliding motion gives much the same effect as would a limited motion of the wheel when the rail section and cards are on the wheel.

The integral stop 37 at the rear end of the rail section keeps the cards from running off that end. I provide a removable stop 105 to keep the cards from running off the other end of the rail section. If the rail section were not arranged to shift longitudinally in the tray, the tray could be provided with a low front wall which would serve this purpose; but when the rail section is longitudinally slidable in the tray, it becomes advisable to put the removable stop on the end of the rail section itself.

The removable stop 105 comprises a pair of laterally extending wings 106 (much like the wings of the integral stops 37) and a central hub portion 107 which receives and embraces the head and exposed flange of the rail section. The hub portion 107 carries an external groove 108 for receiving a spring clip 109. The spring clip 109 lies within the groove 108 and embraces the hub 107. It is bent inwardly rather sharply to form a detent 110 which passes through a slot provided in the adjacent side wall of the hub 107 and enters a slot 111 formed in the flange of the rail section 32. The spring clip 109 includes an outwardly extending release finger 112 which may be readily lifted to pull the detent portion 110 out of the slot 111 when the stop is to be removed from the end of the rail section.

The stop 105 is preferably removed from the rail section before the rail section is set back in the drum. However, this is not necessary, and the stop 105 may be left more or less permanently on the rail section, being removed only when it is desired to load or unload cards off the end of the rail. Under some conditions it is advisable to take the rail sections from the wheel and put them in trays, whereby the cards in each rail section may be assigned to a different operator for intensive posting, revision, additions, etc. In this way, a number of operators may simultaneously work on the cards normally on a given wheel but which, if retained on the wheel, could not be conveniently served by more than one operator at the same time.

While I have described and illustrated these specific embodiments of my invention, I contemplate that many changes may be made thereover without departing from the scope or spirit of my invention.

I claim:

1. A rotary card index comprising a rotatably mounted wheel-like support, a headed rail peripherally encircling the support and adapted to receive a multiplicity of cards arranged more or less radially of the support and mounted on the rail by keyhole-shaped slots at the inner edges of the cards, and a plurality of arcuately spaced stops on the rail segregating the cards into arcuate groups, each stop comprising a pair of thin oppositely extending transverse wings of a height substantially that of the rail head whereby the adjacent cards may rock about a transverse axis passing through the rail head.

2. A rotary card index comprising a card supporting wheel formed of two more or less identical halves whereby the wheel is split substantially along a medial plane at a normal to the axis of the wheel, the wheel halves being complementary and each comprising a rim portion, a hub portion, and a set of hollow spoke halves connecting the rim and hub portions, a card mounting rail peripherally encircling the wheel and extending beyond the rim face thereof for receiving a multiplicity of cards arranged more or less radially of the wheel, and an annular slot extending inwardly from the rim face and formed between the rim portions of the two wheel halves, for receiving an inwardly extending flange portion of the rail and mechanism for detachably securing the rail to the wheel, including working parts housed within the hollow spokes.

3. A rotary card index comprising a card supporting wheel formed of two more or less identical halves whereby the wheel is split substantially along a medial plane at a normal to the axis of the wheel, the wheel halves being complementary and each comprising a rim portion, a hub portion, and a set of hollow spoke halves connecting the rim and hub portions, a card mounting rail peripherally encircling the wheel and extending beyond the rim face thereof for receiving a multiplicity of cards arranged more or less radially of the wheel, an annular slot extending inwardly from the rim face and formed between the rim portions of the two wheel halves, for receiving an inwardly extending flange portion of the rail whereby the rail is removably secured to the wheel, and latches mounted on the wheel for cooperating with the rail flange to secure the rail in its slot, each latch being housed within, and concealed by, the body of the wheel at the region where a wheel spoke meets the wheel rim.

4. A rotary card index comprising a card mounting wheel formed from two halves split along a medial plane at a normal to the axis of the wheel, means for mounting a multiplicity of cards about the periphery of the wheel more or less radially thereof, a pull ring positioned at one side of the wheel and substantially opposite the upper edges of the cards, a set of arcuately spaced bolts, each passing through the two halves of the wheel inwardly of the rim of the wheel for holding the two halves assembled, each bolt extending outwardly around the side of the rim and secured at its end to the pull ring, whereby the bolts serve as spokes for mounting the pull ring on the wheel.

5. A rotary card index comprising a card mounting wheel, a card rail peripherally encircling the wheel and adapted to receive a multiplicity of cards arranged more or less radially of the wheel, the rail being subdivided into a series of arcuate sections, each section having an inwardly extending mounting flange, an annular slot formed in the rim of the wheel for receiving the rail flanges, a slot in one end of each rail opening endwise thereof, a wheel-carried element for each rail section extending across the flange-receiving slot for co-operative reception and engagement in the slot of the flange to position the near end of the rail section within the receiving slot, as the near end of the rail section flange is slid longitudinally in the receiving slot, and co-operating retaining means on the other end of each rail section and on the wheel for releasably holding said other end in the receiving slot.

6. A rotary card index comprising a rotatably mounted wheel-like support, a rail peripherally encircling the support, the rail being constructed and arranged to receive and mount a multiplicity of cards arranged more or less radially of the support by virtue of slots adjacent the inner edges of the cards, the rail being subdivided into arcuate sections, and a latch for releasably holding each rail section to the support, the latch comprising cooperating latch elements on the rail section and on the support, the support-carried latch elements being constructed and arranged to yield under seating movement of the rail sections to snap into engagement with the section-carried latch elements.

7. A rotary card index comprising a rotatably mounted wheel having a rim, a rail encircling the wheel and extending outwardly of the rim face for receiving and mounting a multiplicity of cards arranged more or less radially of the wheel about the rim thereof, the rail being subdivided into a plurality of arcuate sections, a latch mounted inwardly of the rim face for engaging each rail section to retain it on the wheel, and a release member exposed for digital manipulation at the rim face for releasing the latch to permit the removing of the rail section.

8. A rotary card index comprising a rotatably mounted wheel having a rim, a rail encircling the wheel and extending outwardly of the rim face for receiving and mounting a multiplicity of cards arranged more or less radially of the wheel about the rim thereof, the rail being subdivided into a plurality of arcuate sections, a latch element carried by each rail section, a latch element for each rail section mounted on the wheel inwardly of the rim face for latching cooperation with the latch element of the rail, a latch release member exposed to the rim face for manual engagement, and spring means interposed radially within the rim face for normally urging the latch to latching position.

9. A rotary card index comprising a pair of like wheel halves assembled to provide a unitary wheel split along a medial plane at a normal to the axis of the wheel, the wheel having a rim face with an annular peripheral slot formed therein along the line of split, a rail encircling the wheel and extending outwardly of the rim face for receiving and mounting a multiplicity of cards arranged more or less radially of the wheel about the rim; the rail being subdivided into a plurality of arcuate sections, each including a flange portion received in the slot, a latch element in the flange portion of each rail section; a latch element disposed inwardly of the rim face for latching engagement with the latch element of each rail section to retain the rail section on the wheel, a pivot pin for each latch disposed substantially in the plane of the split and at a normal to the radius of the axis of the wheel, and bearings, carried by at least one of the mating faces of the split wheel halves, to support the pivot pin for each latch.

10. A rotary card index comprising a card mounting wheel, a card rail peripherally encircling the wheel and adapted to receive a multiplicity of cards arranged more or less radially of the wheel, the rail being subdivided into a series of arcuate sections, each section having an inwardly extending mounting flange, an annular slot formed in the rim of the wheel for receiving the mounted flanges of the rails, the wheel being formed by two wheel halves split along a medial plane at a normal to the axis and substantially in the plane of the slot, assembly bolts passing transversely through the wheel halves adjacent the wheel rim for holding the halves assembled together, a hook at one end of each rail section for hooking and retaining engagement of one of the respective assembly bolts, cooperating retaining means on the opposite end of each rail section and on the wheel for releasably holding the other end of each rail section in the slot, and a pull ring disposed at one side of the wheel and at a radius greater than the rim of the wheel, the assembly bolts extending to and secured to the pull ring to constitute supporting spokes therefor, whereby the assembly bolts constitute assembly bolts for the wheel halves, retaining pins for the rail hooks and spokes for the pull ring.

11. A rotary card index comprising a wheel-like support, means for mounting it with its axis substantially in a horizontal plane, a rail peripherally encircling the support, a rail being constructed and arranged to receive and mount a multiplicity of cards arranged more or less radially of the support by virtue of slots adjacent the inner edges of the cards through which the rail extends, whereby the cards may shift along the rail, stop means interposed at arcuately spaced intervals to limit the shifting of the cards along the rail, and means for compensating for the tendency of the wheel to back roll due to the unbalancing effect of the shifting of the cards, said compensating means comprising friction members continuously effective to put a substantially equal frictional drag upon the wheel, and thereby upon the rails, against rotation in either direction.

12. A rotary card index comprising a wheel-like support, means for mounting it with its axis substantially in a horizontal plane, a rail peripherally encircling the support, the rail being constructed and arranged to receive and mount a multiplicity of cards arranged more or less radially of the support by virtue of slots adjacent the inner edges of the cards through which the rail extends, whereby the cards may shift along the rail, and means for compensating for the tendency of the wheel to back roll due to the unbalancing effect of the shifting of the cards, said compensating means comprising friction members continuously effective to put a positive frictional drag upon the wheel against rotation in either direction.

13. A rotary card index comprising a rotatably mounted wheel-like support, a rail peripherally encircling the support, the rail being constructed and arranged to receive and mount a multiplicity of cards arranged more or less radially of the support by virtue of slots adjacent the inner edges of the cards through which the rail extends, the rail including relatively long arcuate sections fixedly secured to the wheel-like support and intervening relatively short slug-like removable sections, and means for releasably anchoring the slug-like sections to the wheel-like support, the rail being so constructed and arranged that when one of the slug-like portions is removed, cards can be end-loaded or unloaded en masse by movement longitudinally over a fixed portion of the rail over the exposed end thereof.

14. A rotary card index comprising a plurality of card carrying wheel-like supports, a common shaft on which the supports are fixed in alignment, means for journaling the shaft for rotation about a substantially horizontal axis, a rail peripherally encircling each support and constructed and arranged to receive and mount a multiplicity of cards arranged more or less radially of the support and slidable along the rail, arcuately spaced stop means for limiting the shifting of the cards along the rail of each support, the stop means on one support being offset relative to those on another support, for the purpose described.

15. A rotary card index comprising a battery of wheel-like supports, a rail peripherally encircling each support, the rail being constructed and arranged to receive and mount a multiplicity of cards arranged more or less radially of the support, the rail of each support being subdivided into arcuate sections, means for releasably mounting each rail section upon its support for removal therefrom with cards thereon, stop means for preventing intersection shifting of the cards upon the rails, and means for journaling the supports of the battery in axial alignment for rotation together, the supports being so fixed relative to each other that their arcuate rail sections are maintained in alignment.

16. The combination with an arcuate rail section adapted to be removably secured to the periphery of a wheel-like support to form, together with similar rail sections, an encircling rail for the support for receiving and mounting cards arranged more or less radially of the support, the rail section comprising a head portion and a downwardly extending mounting flange portion and adapted to receive and mount a multiplicity of cards by virtue of keyhole shaped slots extending inwardly from the lower margins of the cards through which slot the rail section extends, stop means fixedly carried at one end of the rail section for preventing cards running thereoff endwise, a removable stop member on the other end of the rail section, and means for releasably locking the removable stop member to the rail section to prevent cards running off that end of the rail section.

17. A rotary card index comprising a working counter, a wheel horizontally journaled beneath the counter, a rail peripherally encircling the wheel constructed and arranged to receive and mount a multiplicity of record cards arranged more or less radially of, and about, the wheel, the wheel being forwardly open for manual access and card manipulation by an operator standing before the counter, and the counter being transparent above the wheel for inspection of the cards through the transparent counter while he handles them on the wheel.

18. The combination with a rotary car index comprising a rotatable journaled wheel-like card support having a rim face, a circumferential rail protruding beyond the face for directly receiving a multiplicity of cards arranged thereon more or less radially of the support and for slidably mounting the cards thereon by virtue of key-hole shaped slots on the bottom edges of the cards, of a pull ring disposed at one side of the wheel at a radius bringing the pull ring in hand-resting position, relative to digital manipulation of the cards, laterally opposite the adjacent ends of the cards and laterally beyond the near edge of the rim face, leaving an open space radially between the rim face and the pull ring for sidewise inspection and digital manipulation of the cards through the space, and a plurality of spokes for mounting the pull ring on the support to rotate therewith, the spokes extending radially inwardly from the pull ring to anchorages upon the support radially within the rim face and passing the rim face a spaced distance laterally outwardly thereof, whereby cards mounted on the rail and extending laterally beyond the near edge of the rim face will clear the spokes.

GEORGE C. BRUEN.